United States Patent [19]

Powanda

[11] 3,923,716

[45] Dec. 2, 1975

[54] CONTROL OF FUNGAL GROWTH UTILIZING ALUMINUM SALTS OF ACRYLIC ACID

[75] Inventor: Thomas W. Powanda, Middlesex, N.J.

[73] Assignee: Celanese Corporation, New York, N.Y.

[22] Filed: Jan. 21, 1974

[21] Appl. No.: 435,360

[52] U.S. Cl....260/29.6 MM; 106/15 AF; 260/29.6 R; 260/31.2 R; 260/31.2 MR; 260/45.85 E; 424/317
[51] Int. Cl.² .......................................... C08L 23/00
[58] Field of Search.......... 106/15 AF; 260/45.85 E, 260/29.6 R, 31.2 R, 31.2 MR, 29.6 MM; 424/317

[56] References Cited
UNITED STATES PATENTS

| | | | |
|---|---|---|---|
| 2,476,235 | 7/1949 | Benignus | 106/15 |
| 2,635,055 | 4/1953 | Figdor | 106/15 |
| 2,784,172 | 3/1957 | Slocombe et al. | 260/45.85 |
| 3,048,516 | 8/1962 | Mosca | 106/15 |
| 3,167,473 | 1/1965 | Leebrick | 260/29.6 |

OTHER PUBLICATIONS

Journal Oil & Colour Chemists' Assoc. Vol. 39 (1956) pp. 900–908; Arnold et al.

*Primary Examiner*—Eugene C. Rzucidlo

[57] ABSTRACT

An improved method for inhibiting fungal (e.g., mold) growth formation in an organic coating, e.g., emulsion latex paint, exposed to fungi growing conditions is disclosed. The improvement comprises utilizing in said coating an amount effective (e.g., from about 0.03% to about 1.0% percent by weight of the coating) to inhibit fungal growth of an aluminum salt of acrylic acid.

7 Claims, No Drawings

CONTROL OF FUNGAL GROWTH UTILIZING ALUMINUM SALTS OF ACRYLIC ACID

BACKGROUND OF THE INVENTION

As is well-known, organic substrates are susceptible in varying degrees to the growth of fungi such as mold therein or thereon which growth detrimentally affects the substrates. Coatings such as paints or the like are often utilized under atmospheric conditions such as high moisture content and warm temperatures which favor mold formation. Under such conditions, fungal growth can occur to such an extent that the paint can discolor and turn dark. In some instances, the fungal growth can cause decomposition of the paint binder and a concomitant loosening of the pigment. Also, the paint may be loosened from and detached from the substrate. Emulsion latex paints, which are popular and commercially successful formulations, are particularly prone to bacterial attack. These emulsion type lattices contain generally long linear polymers more likely to be attacked by bacteria than alkyd resin-based paints which have a greater concentration of aromatic rings.

Mercurial compounds such as, for example, phenylmercury salts of organic acids and the like are well-known biocidal agents which have been added to paints as antimicrobial agents. These mercurial compounds have often been added to organic solvents such as benzene, carbon tetrachloride, naphtha, mineral spirits and the like and dispersed in a paint. In addition, these compounds have been used in drying oils such as linseed oil, tung oil and synthetic paint vehicles such as the well-known alkyd and acrylic resin paints.

Although these mercurial compounds are effective antimicrobial agents, mercury presents a well-known, severe ecological problem in that it is a persistent and wide ranging inhibitor of many other forms of life. Restrictions have been imposed and/or are being considered which would severely limit the use of mercurial compounds in coatings or the like where these compounds may enter into the ecological cycle.

OBJECTS AND SUMMARY OF THE INVENTION

It is an object of this invention to provide a process for controlling fungal growth on organic surfaces under fungal growth promoting conditions which method substantially alleviates or reduces the problems of the prior art.

It is further an object of this invention to provide a method for controlling fungal, particularly mold, growth on organic coated surfaces under conditions which promote fungal growth utilizing a fungal growth inhibitor which does not present a severe ecological problem.

It is also an object of this invention to provide an organic coating, particularly a paint, which may be used under fungal growth promoting conditions which organic coating contains an amount effective to prevent fungal growth of an inhibiting agent which does not present serious ecological problems.

These and other objects of the invention are provided in one aspect by a method for control of fungi in an organic coating exposed to conditions which promote fungal growth which method comprises utilizing in said coating an amount effective to control fungi of an aluminum salt of acrylic acid.

In another aspect of the present invention, there is provided a fungal growth inhibiting composition comprising an organic coating containing therein a minor amount of an aluminum salt of acrylic acid effective to inhibit fungal growth.

DESCRIPTION OF PREFERRED EMBODIMENTS

Aluminum is a trivalent metal and forms a mono-, di- and tri-substituted salt with acrylic acid, and it should be understood that the term "aluminum salt of acrylic acid" is intended to include each of these salts and mixtures thereof. Each of these salts has been found effective for use in the present invention. These compounds may be formed by first mixing acrylic acid in an aqueous solution of sodium hydroxide to form sodium acrylate. Aluminum trichloride ($AlCl_3 \cdot 6H_2O$) may be added to the sodium acrylate solution to form aluminum acrylate and sodium chloride. The insoluble aluminum acrylate may be efficiently separated from the aqueous reaction media containing the sodium chloride in solution. The sodium acrylate/aluminum tri-chloride molar ratio may be adjusted to provide the desired aluminum mono-, di- or tri-acrylate, that is, a molar ratio, sodium acrylate/aluminum tri-chloride, of 3 to 1, yields aluminum tri-acrylate, of 2 to 1 yields aluminum di-acrylate and 1 to 1 yields aluminum mono-acrylate.

The aluminum salts of acrylic acid are generally utilized in a minor amount effective to inhibit mold and/or other fungal growth in the particular organic coating which amount can be, for example, from about 0.03% to about 1.0%, preferably from about 0.05% to about 0.2%, percent by weight of the coating. The aluminum salts of acrylic acid have been found to be particularly effective for use in inhibiting fungal growth such as mold in emulsion paints which have long linear polymer-type lattices. As noted above, these emulsion paints have been found to be particularly prone to fungal attack.

The present invention provides in the emulsion paint an effective (e.g., a fungal growth inhibiting) amount of an aluminum salt of acrylic acid which allows these paints to be utilized in an atmosphere under conditions which would otherwise promote the formulation of fungal growth (such as mold) while inhibiting or suppressing this growth.

In addition, the aluminum salts of acrylic acid do not have the detrimental ecological properties mercurial salts have been found to possess which would detrimentally affect humans, animals and/or lower forms of life. Also, the aluminum salts of acrylic acid are relatively odorless in constrast to other aluminum salts of organic acids, such as aluminum butyrates, which have very objectionable odors and are unsuitable for use around humans.

Although the aluminum acrylates have been described particularly for use in organic paints such as emulsion paints, it will be understood that these salts may be utilized in any organic substrate which may be attacked by fungi. Such substrates include, for example, coatings of polymeric materials such as all naturally occuring coatings materials and all synthetically prepared coatings materials, such as varnishes, oil stains, epoxy resin base coatings, polyurethanes, alkyd resin coatings and the like.

The aluminum salts of acrylic acid may be utilized in the particular organic coating in any form in which they function to inhibit bacterial formation. Generally, the aluminum salts of acrylic acid are utilized in the form of solid particles typically having an average particle diameter of from about 1 to about 250, generally from about 3 to about 150, often from about 5 to about 100, microns. These particles may be dispersed in a melt or solution of the organic material which forms the organic coating. For example, the particulate aluminum salts of acrylic acid may be dispersed in a latex emulsion paint by mixing and stirring. Other suitable techniques are apparent to those skilled in the art.

The invention is additionally illustrated in connection with the following Examples which are to be considered as illustrative of the present invention. It should be understood, however, that the invention is not limited to the specific details of the Examples.

EXAMPLE 1

The mono-, di- and tri-acrylates of aluminum are each formed by first mixing sodium hydroxide and acrylic acid in water for form sodium acrylate. Aluminum trichloride ($AlCl_3 \cdot 6H_2O$, 50 percent aqueous solution) is thereafter added in the appropriate molar amount relative to sodium acrylate (i.e., 1 : 3, 1 : 2 and 1 : 1) to form the desired tri-, di- and mono-acrylic acid salt of aluminum. The aluminum acrylate salts are each insoluble in water and precipitate from solution as fine powder having an average particle size of about 25 microns, while sodium chloride remains in solution. The aluminum acrylate powder is filtered from the solution, washed with water and acetone and dried.

Commercially available applesauce is placed into Petri dishes. Each of the aluminum mono-, di- and tri-acrylates is mixed (in duplicate) in amounts of 0.25, 0.5 and 1.0 percent by weight of the applesauce to the applesauce to provide a duplicate set of samples for each acrylate and in each amount. The samples are covered. One set of the samples is maintained at room temperature (about 24°C.) while the other set is maintained in a refrigerator (about 5°C.).

The control samples (without any aluminum acrylates) maintained at room temperature fail after about 3 days. Each of the applesauce samples containing either 0.25, 0.5 and 1.0 weight percent of each of the aluminum mono-, di- and tri-acrylates at room temperature show no mold growth even after 55 days at which time the test is terminated.

After 28 days, the control samples maintained at refrigerator temperature show substantial mold growth while the samples at each amount of addition and of each salt do not show any mold growth. The test at refrigerator temperature is terminated after 44 days due to the failure of the aluminum acrylate-containing samples to show mold growth.

Applesauce is chosen as the test vehicle since it is known that applesauce offers a convenient, available mode for observing relatively rapid mold growth.

EXAMPLE II

Commercially available emulsion-type lattices exterior paints are coated on substrates maintained in the Caribbean exposed to fungal growth promoting conditions, i.e., relatively high temperature, high moisture conditions.

Some of the paint samples contain the mono-, di- and/or tri-acrylic acid salts of aluminum in amounts of 0.1 percent. Other samples contain 0.1 percent of a commercially available mold inhibiting compound (Metasol T K 100), a resin-based fungicide available from Merck, Inc.

After 12 months exposure, the samples are compared. The paint samples which contain the aluminum acrylates exhibit little or no mold growth. The samples which contain the commercially available fungicide Metasol T K 100 appear similar. No observable differences are noted between the aluminum acrylate containing paint samples and the Metasol T K 100 containing samples.

COMPARATIVE EXAMPLE

The mono-, di- and tri-butyrates of aluminum are formed in similar manner to the acrylates of Example I utilizing, however, butyric acid. Although these salts show acceptable mold inhibiting properties when utilized in applesauce in the manner of Example I, these salts have an obnoxious, raunchy, objectionable odor.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. A method for the control of fungi in an emulsion-type latex paint exposed to conditions which promote fungal growth formation which method comprises utilizing in said paint an amount effective to control fungi of an aluminum salt of acrylic acid.

2. The method of claim 1 wherein said aluminum salt of acrylic acid is present in said coating in an amount of from about 0.03 to about 1.0 percent by weight of the coating.

3. The method of claim 2 wherein said aluminum salt of acrylic acid is present in an amount of from about 0.05 to about 0.2 percent by weight of the coating.

4. A fungal growth inhibiting composition comprising an emulsion-type latex paint which is adapted to promote fungi growth therein and a minor amount of an aluminum salt of acrylic acid effective to inhibit fungal growth.

5. The composition of claim 4 wherein said aluminum salt of acrylic acid is present in said coating in an amount of from about .03 to about 1.0 percent by weight of the coating.

6. A mold inhibiting composition adapted to be utilized in mold growth promoting conditions, said composition comprising an organic paint susceptible to the growth of fungi therein, said paint containing therein a minor amount effective to inhibit mold growth of an aluminum salt of acrylic acid.

7. In an organic coating material susceptible to the growth of fungi therein, the improvement which comprises incorporating in said organic coating material selected from the group consisting of naturally occuring coating materials, varnishes, oil stains, epoxy resin base coatings, polyurethanes, and alkyd resin coatings an amount effective to inhibit fungi growth of an aluminum salt of acrylic acid.

* * * * *